(12) United States Patent
Qi et al.

(10) Patent No.: US 11,468,465 B2
(45) Date of Patent: Oct. 11, 2022

(54) FRICTIONLESS ENTRY INTO COMBINED MERCHANT LOYALTY PROGRAM

(71) Applicant: Block, Inc., San Francisco, CA (US)

(72) Inventors: Yongxue Qi, San Francisco, CA (US); John Berian James, San Francisco, CA (US); Amrik Kochhar, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/099,466

(22) Filed: Nov. 16, 2020

(65) Prior Publication Data

US 2021/0073849 A1 Mar. 11, 2021

Related U.S. Application Data

(63) Continuation of application No. 15/194,250, filed on Jun. 27, 2016, now Pat. No. 10,929,866.

(51) Int. Cl.
| | | |
|---|---|---|
| *G06Q 30/00* | (2012.01) | |
| *G06Q 30/02* | (2012.01) | |
| *G06Q 20/10* | (2012.01) | |
| *G06Q 20/20* | (2012.01) | |
| *H04L 67/306* | (2022.01) | |

(52) U.S. Cl.
CPC ....... *G06Q 30/0229* (2013.01); *G06Q 20/102* (2013.01); *G06Q 20/20* (2013.01); *H04L 67/306* (2013.01)

(58) Field of Classification Search
CPC .... G06Q 30/229; G06Q 20/102; G06Q 20/20; H04L 67/306
See application file for complete search history.

(56) References Cited

U.S. PATENT DOCUMENTS

| | | |
|---|---|---|
| 5,774,868 A | 6/1998 | Cragun et al. |
| 5,878,337 A | 3/1999 | Joao et al. |

(Continued)

FOREIGN PATENT DOCUMENTS

| | | |
|---|---|---|
| CA | 3 019 369 A1 | 10/2017 |
| WO | 2013/015746 A2 | 1/2013 |
| WO | 2017/172967 A1 | 10/2017 |

OTHER PUBLICATIONS

Munson, J., and Gupta, V.K., "Location-Based Notification as a General-Purpose Service," dated Sep. 28, 2002, Retrieved from the Internet URL: https://ai2-s2-pdfs.s3.amazonaws.com/1 bb5/6ae0a70b030e2f2376ed246834bddcabd27b.pdf, pp. 40-44.

(Continued)

*Primary Examiner* — Alvin L Brown
(74) *Attorney, Agent, or Firm* — Lee & Hayes, P.C.

(57) ABSTRACT

Techniques and arrangements for generating multi-merchant loyalty programs and dynamically enrolling customers into a multi-merchant programs. The multi-merchant loyalty programs can be generated based on a determination that the merchants in respective programs are complementary, and/or the merchants being located within a threshold distance of one another. In some instances, a customer can be automatically enrolled in a multi-merchant loyalty program responsive to conducting a transaction with one of the merchants in the program. After enrollment, the customer can receive incentives to conduct transactions with the merchants in the program.

20 Claims, 9 Drawing Sheets

(56) References Cited

U.S. PATENT DOCUMENTS

| | | | |
|---|---|---|---|
| 6,292,786 | B1 | 9/2001 | Deaton et al. |
| 7,764,185 | B1 | 7/2010 | Manz et al. |
| 10,929,866 | B1 | 2/2021 | Qi et al. |
| 2003/0204447 | A1 | 10/2003 | Dalzell et al. |
| 2004/0260607 | A1 | 12/2004 | Robbins et al. |
| 2005/0222910 | A1 | 10/2005 | Wills |
| 2006/0004598 | A1 | 1/2006 | Boyd et al. |
| 2007/0150588 | A1 | 6/2007 | Ghadialy et al. |
| 2007/0179836 | A1 | 8/2007 | Juang et al. |
| 2007/0192182 | A1 | 8/2007 | Monaco et al. |
| 2008/0177624 | A9 | 7/2008 | Dohse |
| 2008/0197188 | A1 | 8/2008 | Jagatic et al. |
| 2008/0201224 | A1 | 8/2008 | Owens et al. |
| 2010/0057661 | A1 | 3/2010 | Otto et al. |
| 2010/0257040 | A1 | 10/2010 | Hunt |
| 2010/0269059 | A1 | 10/2010 | Olthmer et al. |
| 2011/0137928 | A1 | 6/2011 | Engle et al. |
| 2011/0264501 | A1 | 10/2011 | Clyne |
| 2012/0282893 | A1 | 11/2012 | Kim et al. |
| 2013/0060641 | A1 | 3/2013 | Al Gharabally |
| 2013/0091001 | A1 | 4/2013 | Jia et al. |
| 2013/0197980 | A1 | 8/2013 | Lerner et al. |
| 2013/0218670 | A1* | 8/2013 | Spears ............... G06Q 30/0248 705/14.47 |
| 2013/0297446 | A1 | 11/2013 | Nagarajan et al. |
| 2014/0040007 | A1 | 2/2014 | Relyea, Jr. et al. |
| 2015/0095141 | A1 | 4/2015 | Razdan et al. |
| 2015/0120411 | A1 | 4/2015 | Kneen |
| 2015/0178750 | A1 | 6/2015 | Robinson |
| 2016/0171540 | A1 | 6/2016 | Mangipudi et al. |
| 2016/0203497 | A1 | 7/2016 | Tietzen et al. |
| 2017/0278125 | A1* | 9/2017 | Tietzen .................. G06Q 20/12 |
| 2017/0286989 | A1 | 10/2017 | Zigoris et al. |
| 2017/0287001 | A1 | 10/2017 | Zigoris et al. |
| 2017/0372434 | A1 | 12/2017 | Winters |
| 2018/0341933 | A1* | 11/2018 | Renke .................... G06Q 40/02 |

OTHER PUBLICATIONS

"Define Frequency", Retrieved from Internet URL:https://www.google.com/search?q=define+freguency&rlz=1C1GCEB_enUS775US775&oq=define+&aqs=chrome.0.69i59l3j69i57j0l4.1111j1j1&sourceid=chrome&ie=UTF-8.

Non-Final Office Action dated Jun. 15, 2018, for U.S. Appl. No. 15/194,250, of Qi, Y., et al., filed Jun. 27, 2016.

Non-Final Office Action dated Jun. 26, 2018, for U.S. Appl. No. 15/087,804, of Zigoris, P., et al., filed Mar. 31, 2016.

Non-Final Office Action dated Nov. 28, 2018, for U.S. Appl. No. 15/087,804, of Zigoris, P., filed Mar. 31, 2016.

Non-Final Office Action dated Jan. 25, 2019, for U.S. Appl. No. 15/087,774, of Zigoris, P., filed Mar. 31, 2016.

Final Office Action dated Feb. 4, 2019, for U.S. Appl. No. 15/194,250, of Qi, Y., et al., filed Jun. 27, 2016.

Final Office Action dated Apr. 3, 2019, for U.S. Appl. No. 15/087,804, of Zigoris, P., et al., filed Mar. 31, 2016.

Advisory Action dated Apr. 15, 2019, for U.S. Appl. No. 15/194,250, of Qi, Y., et al., filed Jun. 27, 2016.

Advisory Action dated Jun. 19, 2019, for U.S. Appl. No. 15/087,804, of Zigoris, P., et al., filed Mar. 31, 2016.

Final Office Action dated Aug. 6, 2019, for U.S. Appl. No. 15/087,774, of Zigoris, P., et al., filed Mar. 31, 2016.

Non-Final Office Action dated Aug. 20, 2019, for U.S. Appl. No. 15/087,804, of Zigoris, P., et al., filed Mar. 31, 2016.

Non-Final Office Action dated Sep. 17, 2019, for U.S. Appl. No. 15/194,250, of Qi, Y., et al., filed Jun. 27, 2016.

Non-Final Office Action dated Dec. 5, 2019, for U.S. Appl. No. 15/087,774, of Zigoris, P., et al., filed Mar. 31, 2016.

Final Office Action dated Feb. 20, 2020, for U.S. Appl. No. 15/087,804, of Zigoris, P., et al., filed Mar. 31, 2016.

Final Office Action dated Mar. 2, 2020, for U.S. Appl. No. 15/194,250, of Qi, Y., et al., filed Jun. 27, 2016.

Final Office Action dated May 27, 2020, for U.S. Appl. No. 15/087,774, of Zigoris, P., et al., filed Mar. 31, 2016.

Advisory Action dated Jun. 5, 2020, for U.S. Appl. No. 15/194,250, of Qi, Y., et al., filed Jun. 27, 2016.

Notice of Allowance dated Jun. 24, 2020, for U.S. Appl. No. 15/194,250, of Qi, Y., et al., filed Jun. 27, 2016.

Notice of Allowance dated Oct. 26, 2020, for U.S. Appl. No. 15/194,250, of Qi, Y., et al., filed Jun. 27, 2016.

Office Action dated Sep. 17, 2019, in Canadian Patent Application No. 3,019,369 of Zigoris, P., et al.

Second Office Action dated May 7, 2020, in Canadian Patent Application No. 3,019,369 of Zigoris, P., et al.

International Search Report and Written Opinion for International Application No. PCT/US2017/024824, dated May 31, 2017.

Examiner Requisition dated Mar. 25, 2021, in Canadian Patent Application No. 3,019,369 of Zigoris, P., et al.

Notice of Allowance dated Oct. 15, 2021, in Canadian Patent Application No. 3,019,369 of Zigoris, P., et al.

* cited by examiner

FRICTIONLESS ENTRY INTO COMBINED MERCHANT LOYALTY PROGRAM

RELATED APPLICATIONS

This Application claims priority to U.S. patent application Ser. No. 15/194,250, filed Jun. 27, 2016, and granted as U.S. Pat. No. 10,929,866 on Feb. 23, 2021, which is incorporated herein by reference.

BACKGROUND

Merchants and customers conduct transactions in commerce on a daily basis. In many instances, merchants develop loyalty programs for customers to encourage future purchases. However, the loyalty programs are limited to individual merchants and typically require lengthy applications for customer entry.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3A illustrates a multi-merchant loyalty program generated based on customer activity. FIG. 3B illustrates a multi-merchant loyalty program modified based on customer activity. FIG. 3C illustrates a grouping of a particular merchant in two multi-merchant loyalty programs.

DETAILED DESCRIPTION

Figure 1A:
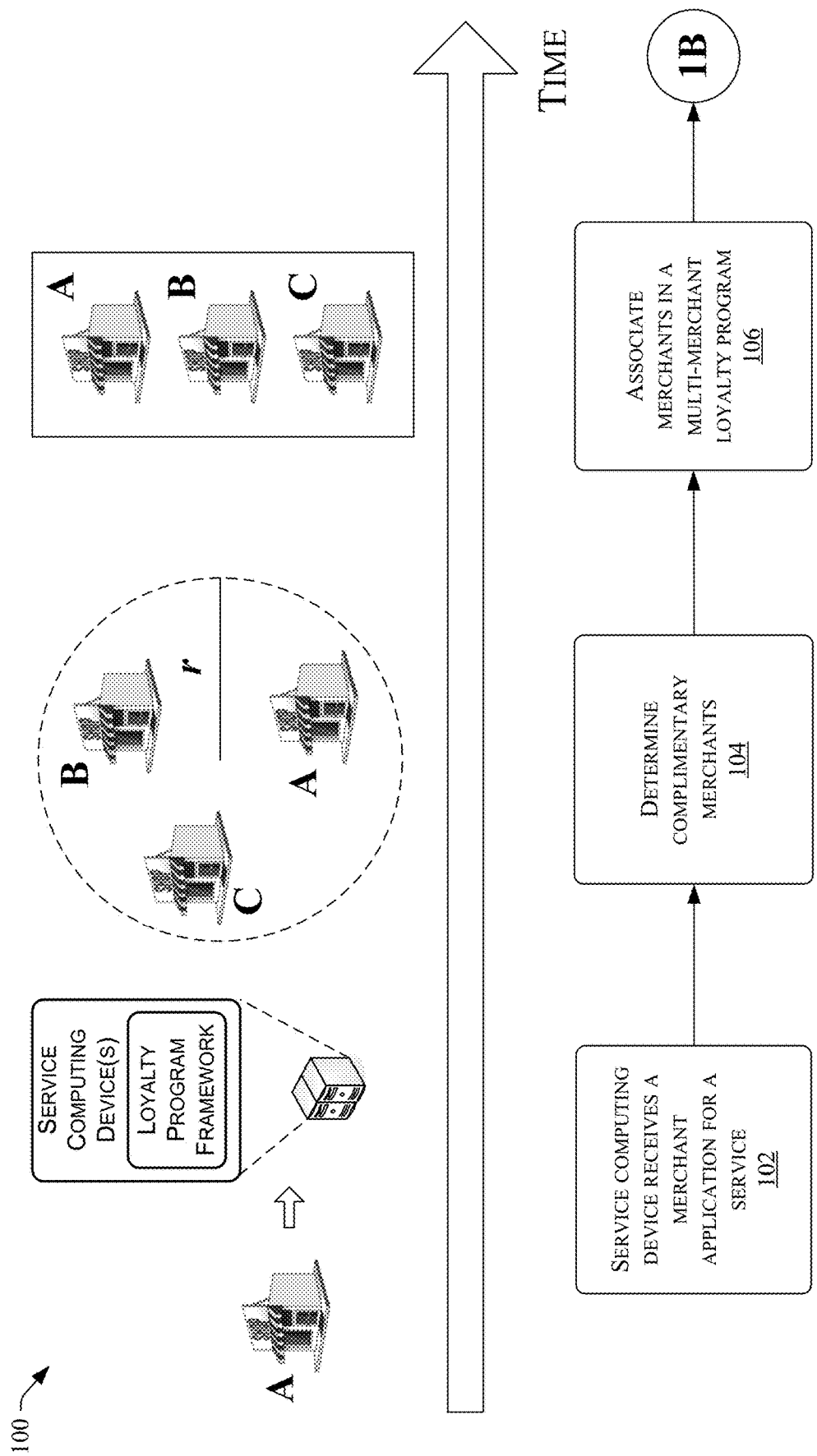
FIGS. 1A-B collectively illustrate an example process for generating and enrolling a customer into a multi-merchant loyalty program.

Some implementations described herein include techniques and arrangements for generating multi-merchant loyalty programs and dynamically enrolling customers into a multi-merchant program. In some instances, a merchant can request a service (e.g., transaction processing service, inventory management service, etc.) from a point-of-sale (POS) system service provider. The merchant can generate a merchant profile with the POS system service provider. The merchant profile can include merchant information (e.g., name, type of business, merchant category code (MCC), date of establishment, average monthly sales, average income of clientele, etc.), inventory and/or goods, a location, and other merchant-related information.

The POS system service provider can evaluate the merchant profile, and can compare the merchant profile with other merchant profiles of the POS system service provider to determine one or more complementary merchants that are complementary to one another. A complementary determination can be based on one or more of a merchant type, goods and/or services for sale, quality of goods and/or services, same or similar clientele, respective transaction histories (e.g., a number of transactions by a merchant, an amount of each transaction, etc.), related transaction histories (e.g., proximity in time between customer transactions at each merchant, etc.), other factors which may contribute to one merchant complementing another and/or a combination of the foregoing. In some examples, the POS system service provider can also identify complementary merchants that are within a threshold distance to the onboarding merchant. For example, a merchant onboarding to a POS system service provider can be a coffee shop. The POS system service provider can determine that a bakery located within 5 blocks of the coffee shop provides a complementary service and is within a threshold distance to the merchant. For another example, a merchant onboarding to a POS system service provider can be a hobby shop. The POS system service provider can determine that a hardware store within ½ mile of the hobby shop provides a complementary service and is within the threshold distance of the merchant.

Based on a determination of complementary services and/or location, the POS system service provider can associate two or more merchants in a multi-merchant (e.g., combined) loyalty program. In various examples, the POS system service provider can provide an option to the merchants to join multi-merchant loyalty programs with specified merchants. In such an example, the option may include merchant information for the specified merchants. In some examples, the POS system service provider can provide an open-ended option to the merchants to join a multi-merchant loyalty program. In such examples, the POS system service provider can automatically join existing and/or new merchants into a multi-merchant loyalty program upon a determination of complementary services and proximity.

Additionally or alternatively, the POS system service provider can identify complementary merchants based on services (e.g., programs) to which the merchant is enrolled through the POS system service provider. The POS system service provider can provide services, such as facilitating customer transactions (e.g., payment processing, hardware for reading payment instruments, software to manage transactions, etc.), managing business operations (e.g., inventory supply, employee management, payroll, etc.), marketing (e.g., customer tracking, customer analysis, advertising, business growth, etc.), financial services (e.g., invoice tracking, business loans, etc.), and/or other related business services. For example, an onboarding merchant may enroll for a marketing program with the POS system service provider in order to encourage more business. Responsive to the onboarding merchant enrolling in the program, the POS system service provider may determine that the onboarding merchant is complementary to one or more other well-established merchants. The POS system service provider can make the determination based on one or more of the aforementioned complementary factors (e.g. goods and/or services, merchant type, a distance between merchants, etc.). Based on the determination, the POS system service provider may group the onboarding merchant together with well-established businesses in order to encourage customers of the well-established businesses to shop at the onboarding merchant.

After a multi-merchant loyalty program is established, a customer can conduct a transaction with a merchant who is part of the multi-merchant loyalty program. The customer can use a payment instrument (e.g., a credit card, debit card, gift card, etc.) at the point-of-sale, and can be enrolled in the multi-merchant loyalty program. In some examples, the customer can be automatically enrolled based on data associated with the payment instrument, such as customer name, contact information, etc. In some examples, the customer can be queried regarding a desire to participate in the multi-merchant loyalty program. In such examples, the customer may be requested to input an email address, phone number, or other contact information.

After enrollment in the multi-merchant loyalty program, the customer can conduct a transaction at any of the merchants in the multi-merchant loyalty program, and can receive benefits (e.g., purchase incentives) at a given merchant based on previous transactions with other merchants in the program. The benefits can be for future transactions with the merchant with which the customer conducted the transaction, or for other merchants in the multi-merchant loyalty program. The benefits can be in the form of loyalty points, reward points, coupons, special discounts, or other benefits to encourage future transactions with the merchants of the multi-merchant loyalty program.

In various examples, the POS system service provider can store a plurality of customer profiles. The customer profiles can include customer transaction information (e.g., where a customer shops, average amount of purchases, frequent consecutive purchases at different merchants, loyalty programs enrolled in, customer preferences, etc.). In some examples, the POS system service provider can determine that the one or more merchants are complementary based at least in part on the customer transaction information. In such examples, the POS system service provider can add a merchant to a multi-merchant loyalty program based on the customer profile. For example, a customer may be enrolled in a multi-merchant loyalty program including merchants A, B, and C. The POS system service provider may determine that the customer frequently purchases an item from merchant D after shopping at merchant C. Based on the consecutive transaction at different merchants, the POS system service provider may determine that the merchants are complementary. As such, the POS system service provider can add merchant D to the multi-merchant loyalty program including merchants A, B, and C. In some examples, the POS system service provider may send an authorization request to merchant D to authorize the addition of merchant D into the multi-merchant loyalty program.

Example techniques described herein can apply machine learning to train a model with transaction information to determine one or more complementary merchants. The model can be trained to determine complementary merchants based on merchant and/or customer transaction information.

For discussion purposes, example implementations, such as a POS system service provider, are described below with reference to the corresponding figures. However, implementations herein are not limited to the POS system service provider. The techniques discussed herein may be extended to other environments, other system architectures, other types of applications, and so forth, as will be apparent to those of skill in the art in light of the disclosure herein.

Figure 1B:
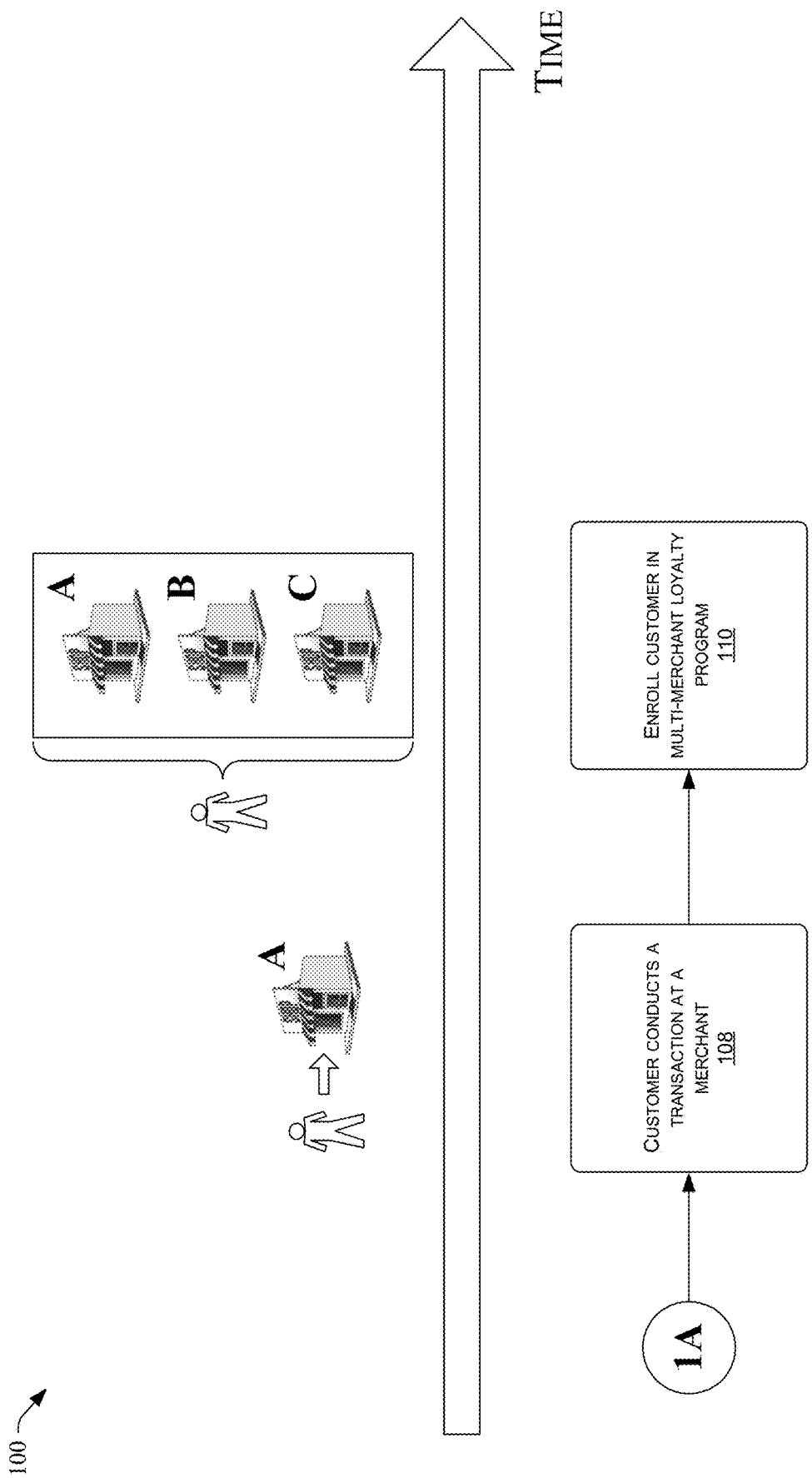

FIGS. 1A-B collectively illustrate an example process 100 for generating and enrolling a customer into a multi-merchant loyalty program.

FIG. 1A illustrates, at 102, a service computing device receiving a merchant application for a service via a POS system service provider. In various examples, the onboarding merchant can apply for a first service and/or a first set of services provided by the POS system service provider (e.g., the onboarding merchant can be a new client of the POS system service provider). In some examples, the onboarding merchant can be an existing customer of the POS system service provider (e.g., the onboarding merchant can be previously enrolled in one or more services provided by the POS system service provider). In such examples, the application for the service can include an additional service to be provided by the POS system service provider. The application can include merchant information (e.g., data) of an onboarding merchant (e.g., a merchant applying for a service), such as a business name, a type of business, a date of establishment, average monthly sales, inventory and/or goods provided by the merchant, a merchant location, and/or other information which may be pertinent to the service provided by the POS system service provider.

The POS system service provider can provide services (e.g., programs) to facilitate a merchant in conducting customer transactions (e.g., payment processing, hardware for reading payment instruments, software to manage transactions, etc.), managing business operations (e.g., inventory supply, employee management, payroll, etc.), marketing (e.g., customer tracking, customer analysis, advertising, business growth, etc.), financial services (e.g., invoice tracking, business loans, etc.), or other related business services.

In various examples, the service computing device can store the merchant information in a knowledgebase (e.g., a data store, merchant profile database, etc.) of a loyalty program framework. The knowledgebase can include a plurality of merchant profiles with respective merchant information. As will be discussed in greater detail with respect to FIG. 2, the loyalty program framework can include various modules configured to generate and administer a multi-merchant loyalty program.

At 104, the service computing device determines one or more complementary merchants to the onboarding merchant. In the illustrative example, onboarding merchant A is determined to be complemented by and within a threshold distance to merchants B and C. A complementary determination can be based on a comparison of merchant profiles and/or merchant information provided in the application. In various examples, merchants can be considered complementary based on merchant type, goods and/or services for sale, quality of goods and/or services, same or similar clientele, respective transaction histories (e.g., a number of transactions by a merchant, an amount of each transaction, etc.), related transaction histories (e.g., proximity in time between customer transactions at each merchant, etc.), other factors which may contribute to one merchant complementing another, and/or a combination of the foregoing. In examples in which the onboarding merchant is a new client of the POS system service provider, the complementary determination can be based on information provided by the merchant, such as in the application (e.g., merchant type, MCC, goods and/or services, quality of goods, etc.). In examples in which the onboarding merchant is an existing client of the POS system service provider, the complementary determination can be based on one or more of the foregoing factors and/or historical data learned by the POS system service provider (e.g., clientele information, transaction history, etc.). For example, a service computing device can determine that goods sold by a first merchant type are typically consumed with goods from a second merchant type (e.g., coffee from one merchant type consumed with pastries from another merchant type), and the like. Based on this determination, the service computing device can determine that the first merchant type complements the second merchant type, and vice versa.

In various examples, the complementary determination can be learned based on a transaction history. In some examples, the transaction history can be regionally determined, based on where the merchants are located. For example, in a first region, it may be popular for customers to conduct a transaction at a coffee shop, and shortly thereafter, conduct a transaction at a donut shop. For another example, in a second region, it may be popular for customers to purchase coffee from a first merchant and sourdough bread from a second merchant, shortly thereafter.

In some examples, a complementary determination can be based on an amount of time the respective businesses have been established. In such examples, new businesses can be complemented by well-established successful businesses to encourage customers of the well-established businesses to conduct transactions at the new business. In various examples, the timing consideration for a complementary determination can be based on a service the new business purchases through the POS system service provider, such as a marketing program.

Additionally or alternatively, a complementary determination can be based in part on a distance between merchants. The distance can be a threshold distance, above which, merchants may not be grouped in a multi-merchant loyalty program. The distance can be city blocks, miles, city-based, region-based, or other distance determination. In the illustrative example, the distance is a radius, r from a center of the complementary merchants. In such an example, each of the merchants involved in the multi-merchant loyalty program are located within a threshold distance from a central point shared between the merchants. The radius r can be 3 blocks, 5 blocks, ½ mile, 1 mile, or any other distance. In some examples, the distance can be determined based on a region, city, and/or town associated with the merchants. For example, a distance in a large city may be shorter than a distance in a rural area.

At 106, the service computing device associates merchants in a multi-merchant loyalty program. The association of merchants can link the complementary merchants, such as merchants A, B, and C, into a combined loyalty program. The combined loyalty program can provide a means by which merchants can share customer loyalty rewards, frequent-buyer points, marketing opportunities, and the like between one another. For example, a customer can conduct a transaction with merchant A, and in response to the transaction, receive a coupon for a transaction with merchant B. For another example, the customer can conduct a transaction with merchant A and receive frequent-buyer points, such as one point per dollar spent. The customer can then conduct a transaction with merchant B and use the frequent-buyer points to receive a discount and/or other benefit in the transaction with merchant B.

In various examples, the service computing device can automatically associate complementary merchants together into a multi-merchant loyalty program. In such examples, the service computing device can determine, based on the merchant profiles, that two or more merchants are complementary. Based on the complementary determination, the service computing device can associate the merchants, and generate the multi-merchant loyalty program.

In some examples, the service computing device can query the two or more merchants determined to be complementary regarding a willingness to participate in a multi-merchant loyalty program. The service computing device can query at a time that the merchant is onboarding (e.g., requesting a service of the POS system service provider) and/or at a time in which a complementary determination is made.

FIG. 1B continues the illustration of the process 100 and, at 108, a customer conducts a transaction at a merchant, such as merchant A. In various examples, POS system service provider can recognize the customer as a new customer to the merchant. In some examples, the POS system service provider can recognize the customer as a new customer based on information transmitted via a payment instrument (e.g., a gift card, a debit card, a credit card, etc.) used to conduct the transaction. In some examples, the POS system service provider can determine the customer is new based on a use of a gift card to conduct the transaction. In other examples, the POS system service provider can determine the new customer status by evaluating the merchant profile and/or the customer profile to determine if the payment instrument has been used in a previous transaction. In some example, the POS system service provider can determine the new customer status by receiving input from the merchant and/or the customer indicating the customer is new. In such examples, the merchant could query the customer, and could input the new customer indication.

At 110, the POS system service provider can enroll the customer in a multi-merchant loyalty program. In various examples, the enrollment can be based on the new customer status determined at 108. Additionally or alternatively, the enrollment can be based on a newly formed multi-merchant loyalty program. For example, the customer could be a returning customer, but since the customer's last transaction, the POS system service provider generated a multi-merchant loyalty program including Merchant A.

In various examples, the POS system service provider can automatically enroll the customer into the multi-merchant loyalty program. In such examples, the customer can be automatically joined based on information provided via the payment instrument. For example, contact information can be associated with the payment instrument. The POS system service provider can use the contact information to send multi-merchant loyalty program information, such as coupons, discounts, etc. to the customer.

In some examples, the POS system service provider can query the customer regarding a desire to join the multi-merchant loyalty program. In such examples, customer can be asked to input an email address, cell phone number, or other contact information, in order to join the multi-merchant loyalty program.

In various examples, the customer can be further incentivized to join the multi-merchant loyalty program. In such examples, the customer can be offered bonus discounts, coupons, and/or points for inputting contact information and joining the multi-merchant loyalty program.

Figure 2:
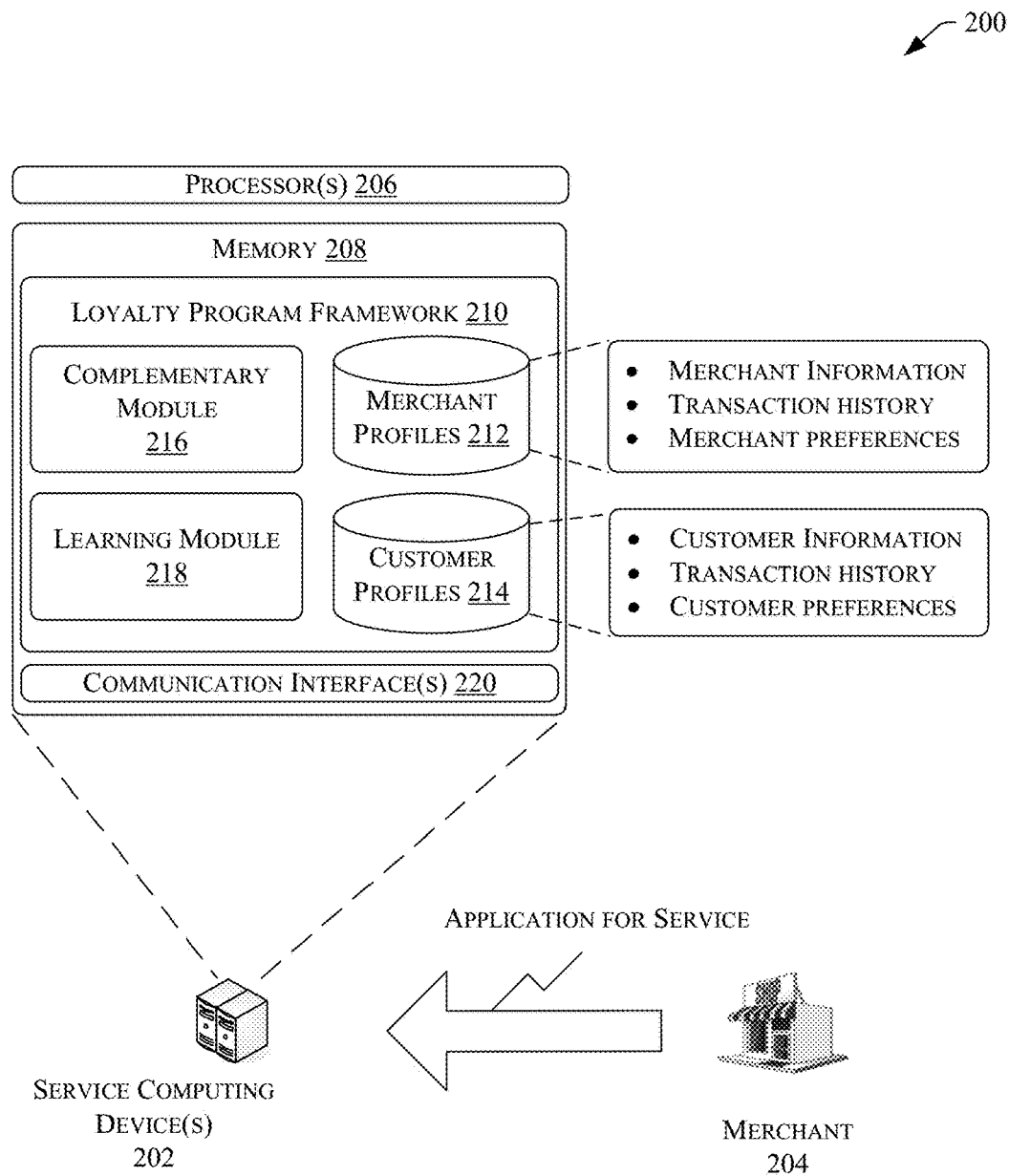
FIG. 2 illustrates an example environment including a service computing device of a POS system service provider configured to receive merchant information from a merchant and generate a multi-merchant loyalty program.

FIG. 2 illustrates an example environment 200 that includes a service computing device 202 of a POS system service provider configured to receive merchant information (e.g., merchant data) from a merchant 204 and generate a multi-merchant loyalty program. In the illustrative example, the merchant can deliver merchant information to the service computing device 202 via an application for a service provided by the POS system service provider. In some examples, the merchant information can be provided via updates to a merchant profile.

As used herein, a merchant 204 may include any business engaged in the offering of goods or services for acquisition by customers. Actions attributed to a merchant 204 may include actions performed by owners, employees, or other agents of the merchant 204 and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants 204 may be referred to as items. Thus, a merchant 204 and a customer may interact with each other to conduct a transaction in which the customer acquires an item from a merchant 204, and in return, the customer provides payment to the merchant. A transaction may include a financial transaction for the acquisition of goods and/or services that is conducted between a customer and a merchant 204.

The service computing device 202 can include one or more processors 206, which can represent, for example, a CPU-type processing unit, a GPU-type processing unit, a field-programmable gate array (FPGA), another class of digital signal processor (DSP), or other hardware logic components that can, in some instances, be driven by a CPU. Additionally, the service computing device 202 may include a memory 208, which can store instructions executable by the processor(s) 206. In various examples, the POS device 202 may include a memory 208, which can store instructions executable by external processing units, such as, for example, by an external CPU-type processing unit.

The service computing device 202 can include any sort of mobile or non-mobile device that includes an instance of a loyalty program framework 210 to process merchant and/or customer information and generate multi-merchant loyalty programs. In some examples, the service computing device 202 can include a distributed computing resource. The loyalty program framework 210 may include one or more modules and/or databases (e.g., a data store) configured to process and store information to generate multi-merchant loyalty programs. In the illustrative example, the loyalty program framework 210 includes a merchant profile database 212, a customer profile database 214, a complementary module 216, and a learning module 218. Other examples can include a greater or lesser number of modules and/or databases.

The merchant profile database 212 can include merchant information from a plurality of merchants. In some examples, the plurality of merchants can include merchants who have accounts and/or use services provided by the service computing device (e.g., POS system service provider). The merchant information can include a merchant name, merchant type, a date of establishment, a time of operation, average monthly sales, average income of clientele, inventory and/or goods, average price of inventory and/or goods, location information, transaction history, merchant preferences, and the like.

The customer profile database 214 can include customer information from a plurality of customers. The plurality of customers can include the customers who have conducted transactions with one or more of the plurality of merchants discussed above. The customer information can include customer name, contact information, average household income, overall transaction history, temporal transaction history (e.g., common transactions with two or more merchants within a designated timeframe), customer preferences, and the like.

The complementary module 216 can include logic to program the one or more processors 206 to extract merchant information from the merchant profile database 212 and/or customer information from the customer profile database 214. The complementary module 216 can process the information and determine whether two or more merchants are complementary merchants. Merchants can be considered complementary based on many factors, including, but not limited to a merchant type, goods and/or services for sale, location, quality of goods and/or services, same or similar clientele, and any other factors which may contribute to one merchant complementing another.

In some examples, a complementary determination can be based on an amount of time the respective businesses have been established. In such examples, new businesses can be complemented by well-established successful businesses to encourage customers of the well-established businesses to conduct transactions at the new business. In various examples, the timing consideration for a complementary determination can be based on a service the new business purchases through the POS system service provider, such as a marketing program.

Additionally or alternatively, a complementary determination can be based in part on a distance between merchants. In some examples, the distance can be respective distances of each merchant from a particular point, such as a central point between the merchants. The distance can be a threshold distance, above which, merchants may not be grouped in a multi-merchant loyalty program. The distance can be city blocks, miles, yards, meters, or other distance determination. In some examples, the distance can be determined based on a region, city, and/or town associated with the merchant. For example, a distance in a large city may be shorter (e.g., 3 city blocks) than a distance in a rural area (e.g., 1 mile).

In various examples, the complementary module 216 can group merchants into categories for the complementary determination. The grouping can be based on similarities of merchant types, goods and/or services for sale, locations, quality of goods and/or services, clientele, and any other factors by which a merchant may be categorized. In some examples, the grouping can be based on a region in which the merchants are located.

Based on a determination of complementary merchants, the complementary module 216 can associate two or more merchants in a multi-merchant (e.g., combined) loyalty program. In various examples, the complementary module 216 can associate the two or more merchants based on groups to which the merchants are assigned. In such examples, the groups to which the respective merchants are assigned can include a known relationship to one another. For example, a first group of merchants can include a plurality of coffee shops and a second group of merchants can include a plurality of bakeries. The complementary module 216 can store a known relationship between the two groups. In some examples, complementary module 216 can associate the merchants in the loyalty program based on a region in which the merchants are located. For example, in a first region, a lobster merchant may be grouped with a dairy shop, and in a second region, a coffee shop may be grouped with a bagel shop.

The complementary module 216 can dynamically size the multi-merchant loyalty program based on the onboarding merchant and/or a customer. In various examples, the size of the multi-merchant loyalty program can be based on merchant considerations extracted from the merchant profile 212. The merchant considerations can include a merchant preference (e.g., willing to participate in multi-merchant loyalty program with a maximum number of other merchants), or other factors affecting the merchant. In some examples, the size of the multi-merchant loyalty program can be based on customer considerations. The customer considerations can include a purchase history (e.g., previous transactions conducted, amounts spent per transaction, etc.), a use of coupons and/or discounts, enrollment in other loyalty and/or reward programs, and the like.

Additionally, the loyalty program framework 210 can include a learning module 218 with logic to program the one or more processors 206 for extraction transaction information from the merchant profile 212 and/or the customer profile 214. In the illustrative example, the transaction history may be stored on the service computing device 202 in the merchant profile 212 and/or the customer profile 214. In other examples, the transaction history can be extracted or received from a remote computing device, such as via one or more communication interfaces 220, and stored in the merchant profile 212 and/or the customer profile 214.

In various examples, the learning module 218 can train the system periodically, such as, for example, at a specified time each day. In some examples, the periodic interval can be determined by a program manager (e.g., monthly, weekly, daily). In some examples, the learning module 218 can obtain or access transaction data when manually directed by the program manager.

In some examples, the learning module 218 can train the system continuously. In such an example, the learning module 218 can train the loyalty program framework continuously with data from transactions conducted by the merchants and/or the customers.

In various examples, the learning module 218 can determine one or more trends in transactions. The one or more trends in transactions can include common purchases made by customers. The common purchases can include transactions for goods and/or services from a particular merchant and/or concurrent transactions with different merchants (e.g., customers often purchase Good A from Merchant Z, followed by Good B from Merchant Y). In some examples, the trends can be region and/or location based trends.

The learning module 218 can determine the trends based on transaction history with the merchants and/or the customers. The learning module 218 can send the trends to the complementary module 216 to assist in determining one or more complementary merchants. In various examples, the complementary module 216 can generate new multi-merchant loyalty programs on the trends. In some examples, the complementary module 216 can update existing multi-merchant loyalty programs based on the trends.

In various examples, the service computing device can include one or more communication interfaces 220 to enable communications between the service computing device 202 and devices associated with one or more merchants 204.

Figure 3A:
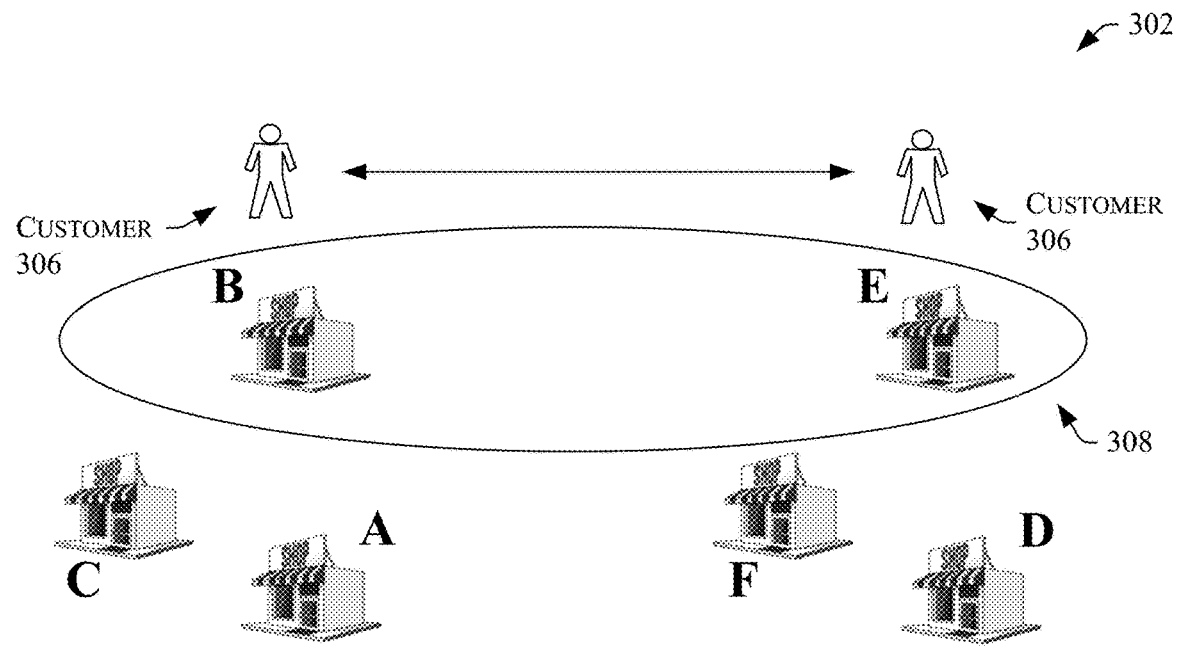
FIGS. 3A-3C illustrate examples of multi-merchant loyalty programs generated and modified based customer information.
Figure 3B:
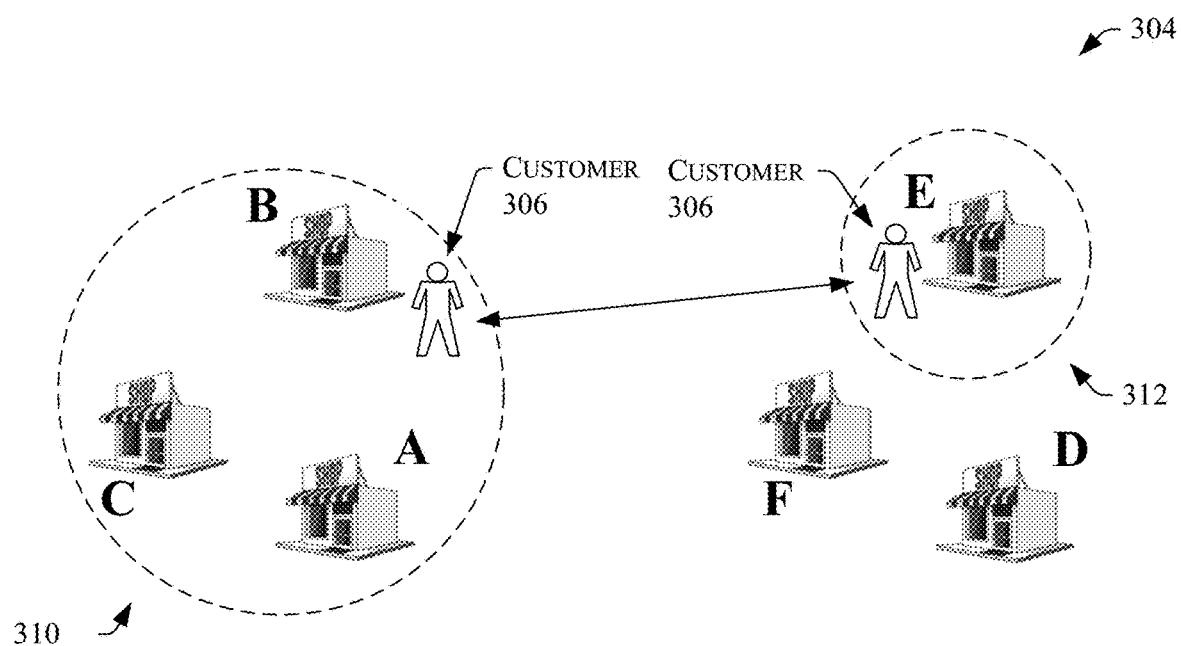

FIGS. 3A and 3B illustrate example environments 302, 304, and 314 in which merchants are grouped in multi-merchant loyalty programs based on customer-derived complementary relationships. FIG. 3A illustrates a grouping of merchants in a multi-merchant loyalty program 308 based on customer 306 activity and/or information, such as such as demographic information, household earnings, customer preferences, and the like.

In various examples, a service computing device of a POS system service provider can identify a complementary relationship between merchants based on the customer 306 activity and/or information. In some examples, a learning module of the service computing device can receive the customer 306 activity and/or information, and send the input to a complementary module. In other examples, the complementary module can determine the customer 306 activity and/or information based data stored in a customer profile of the service computing device.

The customer 306 activity can include a transaction history, habitual acts, and the like. In various examples, the customer 306 activity may include a temporal aspect (e.g., time between transactions with a particular merchant, time between transactions with different merchants, etc.). For example, the service computing device can identify that a customer 306 conducts a transaction with a merchant, such as Merchant B, at about the same time every day, Monday through Friday. For another example, the service computing device can identify that the customer 306 frequently conducts a transaction with merchant E shortly after the transaction with Merchant B.

In various examples, based on the customer 306 activity and/or information, the service computing device can associate Merchant B and Merchant E in a multi-merchant (e.g., combined) loyalty program. In such examples, responsive to the customer 306 conducting a transaction at either of Merchants B or E, the customer may be enrolled in the multi-merchant loyalty program. The customer 306 may be automatically enrolled, and/or queried about joining the multi-merchant loyalty program. In some examples, the query to join may include a request for contact information, such as a phone number and/or an email address. In such examples, the contact information may be saved as a means to communicate one or more rewards and/or benefits received due to enrollment in the multi-merchant loyalty program.

The rewards and/or benefits may be communicated to the customer by the service computing device issuing a credit (e.g., points, coupons, discounts, etc.) to the customer. In some examples, the credit can be stored on a customer profile. In such examples, the credit can be accessed by a merchant of the multi-merchant loyalty program and/or by the customer via the customer profile. In various examples, the credit can be issued to the customer via a text message, email, or other communication interface. In such examples, the service computing device can provide points, coupons, discounts or other rewards to the customer directly. In some examples, the POS system service provider can link the credit to a payment instrument of the customer. In such examples, the credit can be available to the customer responsive to the customer using the payment instrument to conduct a transaction.

In some examples, the service computing device can also evaluate various merchants associated with the customer 306 activity and/or information, and can determine whether the merchants are complementary. In such examples, responsive to a determination that the merchants are complementary, the service computing device can associate the merchants, such as Merchant B and Merchant E, in a multi-merchant loyalty program.

In various examples, prior to association of merchants in a multi-merchant loyalty program, the service computing device may query the respective merchants to determine a willingness to participate in the program. In some examples, the query may be open-ended, describing the multi-merchant loyalty program and the benefits associated therewith. In such examples, the query may occur when the merchant signs up for a service with the POS system service provider, and/or after a customer-derived complementary relationship has been identified.

In some examples, the query may be specific to particular merchants, requesting permission of the merchants to be associated with the specific merchants with a customer-derived complementary relationship. Using the example from above, prior to associating Merchant B and Merchant E, the service computing device may query both merchants to determine if they are willing to participate in a multi-merchant loyalty program in general and/or with one another.

FIG. 3B illustrates a grouping of merchants in a multi-merchant loyalty program 310 that is modified based on customer 306 activity and/or information, such as such as demographic information, household earnings, customer preferences, and the like.

As described above with respect to FIG. 2, a service computing device can identify one or more complementary merchants. The complementary determination can be based on a comparison of merchant profiles and/or merchant information provided to the service computing device, such as in an application for a service. In various examples, merchants can be considered complementary based on merchant type, goods and/or services for sale, quality of goods and/or services, same or similar clientele, transaction history, a time since business establishment, distance between merchants, and any other factors which may contribute to one merchant complementing another.

In various examples, based on the complementary determination, the service computing device may automatically associate the merchants, illustrated as Merchants A, B, and C, in a multi-merchant loyalty program 310. In some examples, prior to association of merchants in a multi-merchant loyalty program 310, the service computing device may query the respective merchants to determine a willingness to participate in the program. In some examples, the query may be open-ended, describing the multi-merchant loyalty program and the benefits associated therewith. In such examples, the query may occur when the merchant signs up for a service with the POS system service provider, and/or after a customer-derived complementary relationship has been identified. In various examples, the query may be specific to particular merchants. For example, Merchant A may be queried as to a willingness to participate in a multi-merchant loyalty program with Merchants B and C, and vice versa.

After the generation of the multi-merchant loyalty program, the customer 306 can conduct a transaction with any of Merchants A, B, and/or C, and can be enrolled in the multi-merchant loyalty program. In various examples, the customer 306 can be automatically enrolled in the program. In some examples, the enrollment may be based on the customer 306 answering a query regarding participation and/or entering requested contact information, such as an email and/or phone number. Responsive to enrollment in the multi-merchant loyalty program 310, the customer 306 can receive benefits and/or rewards.

After enrollment in the multi-merchant loyalty program 310, the customer 306 can conduct a transaction at any of Merchants A, B, and/or C, and can receive benefits based on previous transactions with other merchants in the multi-merchant loyalty program 310. The benefits can be for future transactions with a particular merchant with which the customer conducted the transaction, or for the other merchants in the multi-merchant loyalty program 310. The benefits can be in the form of loyalty points, reward points, coupons, special discounts, or other benefits to encourage future transactions any of the merchants of the multi-merchant loyalty program 310.

In various examples, the service computing device can identify a complementary relationship between one or more merchants in a multi-merchant loyalty program based on the customer 306 activity and/or information. In some examples, a learning module of the service computing device can receive the customer 306 activity and/or information, and send the input to a complementary module. In other examples, the complementary module can determine the customer 306 activity and/or information based data stored in a customer profile of the service computing device.

The customer 306 activity can include a transaction history, habitual acts, and the like. In various examples, the customer 306 activity may include a temporal aspect (e.g., time between transactions with a particular merchant, time between transactions with different merchants, etc.). For example, the service computing device may can identify that a customer 306 conducts a transaction with a merchant, such as Merchant B at about the same time every day, Monday through Friday. For another example, the service computing device can identify that the customer 306 frequently conducts a transaction with merchant E shortly after the transactions with Merchant B.

In various examples, based on the customer 306 activity and/or information, the service computing device can modify the multi-merchant loyalty program 310, by adding Merchant E, the merchant determined to have a customer-derived complementary relationship. In such examples, the service computing device can associate Merchant E with Merchants A, B, and C in the multi-merchant loyalty program 310. As such, the customer 306 can apply benefits earned at any one of Merchants A, B, C and E to transactions conducted at any of the associated merchants.

In various examples, prior to association of Merchant E in the multi-merchant loyalty program 310, the service computing device may query the merchants to determine a willingness to participate in the program. In some examples, the query may be open-ended, describing the multi-merchant loyalty program and the benefits associated therewith. In such examples, the query may occur when Merchant E signs up for a service with the POS system service provider, and/or after a customer-derived complementary relationship has been identified.

In some examples, the query may be specific to particular merchants, requesting permission of the merchants to be associated with the specific merchants with a customer-derived complementary relationship. Using the example from above, prior to associating Merchant E and Merchants A, B, and C, the service computing device may query Merchants A, B, C, and/or E to determine if they are willing to participate in a multi-merchant loyalty program in general and/or with one another.

Figure 3C:
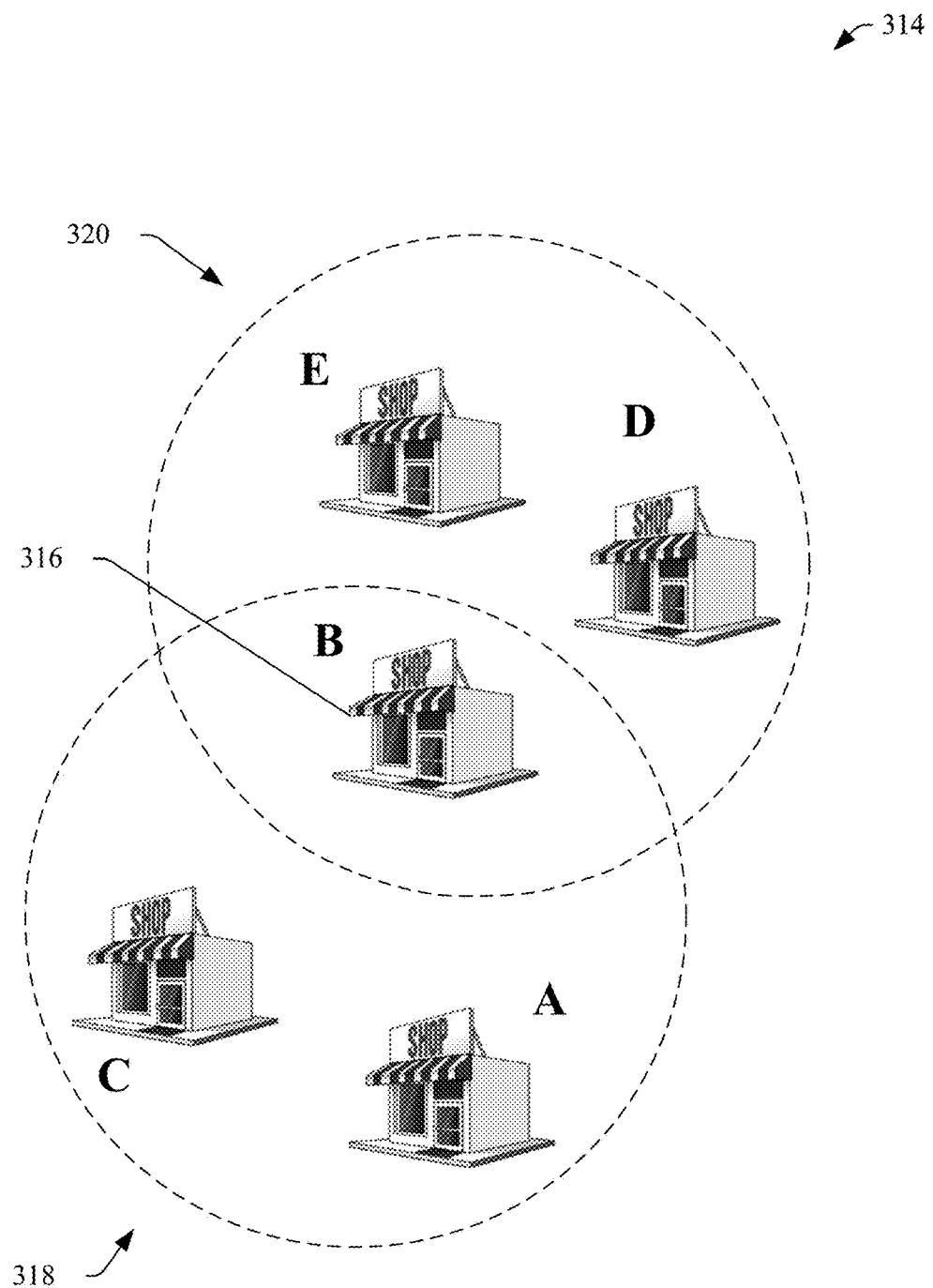

FIG. 3C illustrates a grouping of a particular merchant 316 (e.g., merchant B) in two multi-merchant loyalty programs 318 and 320. In other examples, the POS system service provider can group the particular merchant 316 into a lesser (e.g., 1) or greater number of multi-merchant loyalty programs (e.g., 3, 4, 5, etc.).

In various examples, POS system service provider can group the particular merchant 316 into two multi-merchant loyalty programs 318 and 320 based on one or more goods (e.g., items) and/or services provided by the particular merchant 316. In such examples, the POS system service provider can build a knowledgebase including the various goods and/or services provided by merchants, as well as a determination of which goods and/or services are complementary to one another.

In various examples, the POS system service provider can track a transaction history at multiple merchants (e.g., a plurality of merchants managed by the POS system service provider). The transaction history can include an itemized receipt per transaction with each customer. The transaction history can also include a time component (e.g., day of week, time of day, week of month, etc.) from which the POS system service provider can identify consecutive purchases of particular goods and/or services by individual customers.

Based on the transaction history, the POS system service provider can identify complementary goods and/or services (e.g., the goods and/or services that are commonly purchased consecutively). The POS system service provider can store the knowledgebase in a data store, and can apply the knowledgebase to an onboarding merchant (e.g., a new client of the POS system service provider) to identify one or more complementary merchants to the onboarding merchant.

In various examples, the particular merchant 316 can be a new client of the POS system service provider. In such examples, in the application process, the particular merchant 316 can upload a list of goods and/or services provided by the particular merchant 316. The POS system service provider can process the list of goods and/or services provided by the particular merchant 316, and can identify other merchants, such as Merchants A, C, D, and E, that provide complementary goods and/or services. In some examples, the particular merchant 316 can be an existing client of the POS system service provider. In such examples, the POS system service provider can identify, based in part on the transaction history at the particular merchant 316, other merchants, such as Merchants A, C, D, and E, that provide complementary goods and/or services. In some examples, the other merchants, such as Merchants A, C, D, and E, are clients of the POS system service provider. In other examples, one or more of the other merchants are not clients of the POS system service provider. In such examples, the POS system service provider can determine, based on a general knowledge and/or awareness of the other merchant, such as a merchant type, good and/or service for sale in general, that the other merchant is complementary to the particular merchant 316.

Responsive to the other merchants, the POS system service provider can generate a first multi-merchant loyalty program 318 based on a first good and/or service being complementary with goods and/or services provided by Merchants A and C, and a second multi-merchant loyalty program 320 based on a second good and/or service being complementary with goods and/or services provided by Merchants D and E. For example, the particular merchant 316 may be a coffee shop that sells coffee and eclectic clothing. Based on the coffee sales, the POS system service provider can group the particular merchant 316 with a bakery (e.g., merchant A) and a book store (e.g., Merchant C). Based on the sale of eclectic clothing, the POS system service provider can group the particular merchant 316 with a record store (e.g., Merchant D) and an organic goods store (e.g., Merchant E).

FIGS. 4-7 illustrate flow diagrams of processes for generating multi-merchant loyalty programs and enrolling customers therein. Processes 400, 500, and 600 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 4:
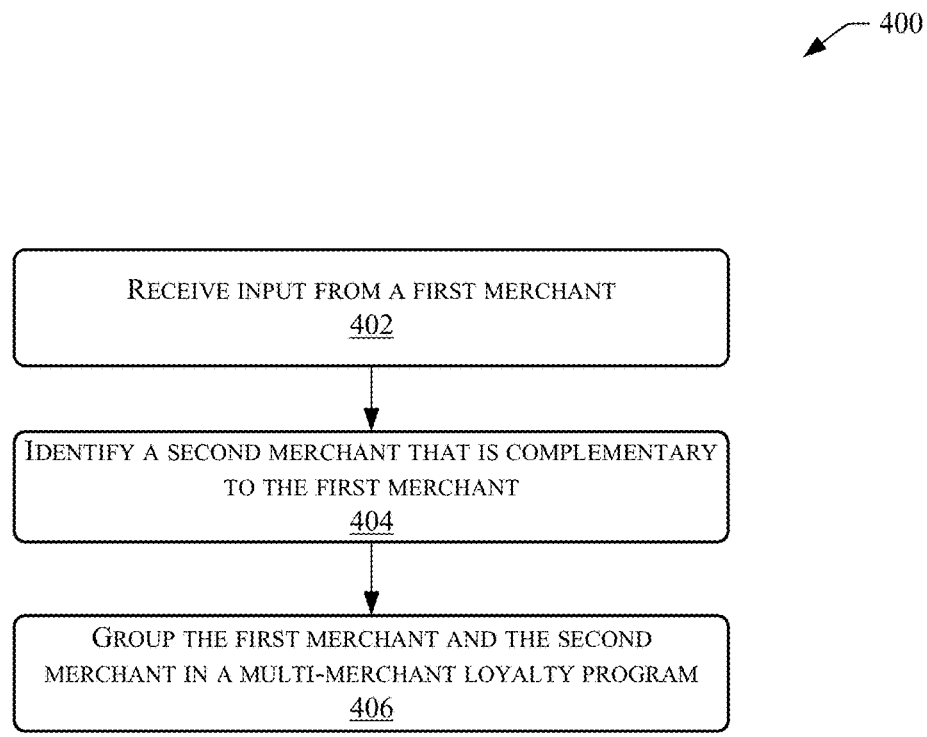
FIG. 4 illustrates a flow diagram of an example process for generating a multi-merchant loyalty program.

FIG. 4 illustrates a flow diagram of an example process for generating a multi-merchant loyalty program.

At 402, a service computing device of a POS system service provider can receive input from a first merchant. The input can be a merchant application for a service via a POS system service provider. In various examples, the first merchant can be an onboarding merchant, applying for a first service and/or a first set of services provided by the POS system service provider (e.g., the onboarding merchant can be a new client of the POS system service provider). In such examples, the input can include merchant information of the onboarding merchant, such as a business name, a type of business, a date of establishment, average monthly sales, inventory and/or goods provided by the merchant, a merchant location, and/or other information which may be pertinent to the service provided by the POS system service provider. In some examples, the onboarding merchant can be an existing customer of the POS system service provider (e.g., the onboarding merchant can be previously enrolled in one or more services provided by the POS system service provider). In such examples, the input can include an additional service to be provided by the POS system service provider.

The POS system service provider can provide services to facilitate a merchant in conducting customer transactions (e.g., payment processing, hardware for reading payment instruments, software to manage transactions, etc.), managing business operations (e.g., inventory supply, employee management, payroll, etc.), marketing (e.g., customer tracking, customer analysis, advertising, business growth, etc.), financial services (e.g., invoice tracking, business loans, etc.), or other related business services.

In various examples, the service computing device can store the merchant information in a merchant profile database (e.g., knowledgebase) of a loyalty program framework. The merchant profile database can include a plurality of merchant profiles with respective merchant information.

At 404, the service computing device can identify a second merchant that is complementary to the first merchant. In some examples, the service computing device can identify one or more merchants that are complementary to the first merchant.

In various examples, the service computing device can identify a complementary merchant based on a comparison of respective merchant profiles (e.g., existing client of the POS system service provider) and/or merchant information (e.g., new client of the POS system service provider). In some examples, merchants can be considered complementary based on merchant type, goods and/or services for sale, quality of goods and/or services, same or similar clientele, and any other factors which may contribute to one merchant complementing another.

In various examples, the service computing device can identify a complementary merchant based on a transaction history. In some examples, the transaction history can be regionally-based depending on where the respective merchants are located. For example, in a first region, it may be popular for customers to conduct a transaction at a coffee shop, and shortly thereafter, conduct a transaction at a bagel shop. For another example, in a second region, it may be popular for customers to purchase coffee from a first merchant and sourdough bread from a second merchant, shortly thereafter.

Additionally or alternatively, the service computing device can identify a complementary merchant based on a distance between merchants. The distance can be a threshold distance, above which, merchants may not be grouped in a multi-merchant loyalty program. The distance can be city blocks, miles, city-based, region-based, or other distance determination. In some examples, the distance can be determined based on a region, city, and/or town associated with the merchant. For example, a distance in a large city may be shorter than a distance in a rural area.

At 406, the service computing device can group (e.g., associate) the first merchant and the second merchant in a multi-merchant (e.g., combined) loyalty program. As illustrated above in FIG. 3C, the service computing device can group the first merchant and a first group of merchants in a multi-merchant loyalty program and a first merchant and a second group of merchants in a second multi-merchant loyalty program. The grouping of merchants can link the complementary merchants into a combined loyalty program. The combined loyalty program can provide a means by which merchants can share customer loyalty rewards, frequent-buyer points, marketing opportunities, and the like between one another in order to encourage additional transactions with the customer. For example, a customer can conduct a transaction with the first merchant, and in response to the transaction, receive a coupon for a transaction with the second merchant. For another example, the customer can conduct a transaction with the first merchant and receive frequent-buyer points, such as one point per dollar spent. The customer can then conduct a transaction with the second merchant and use the frequent-buyer points to receive a discount and/or other benefit in the transaction with the second merchant.

In various examples, the service computing device can automatically group complementary merchants together into a multi-merchant loyalty program. In such examples, the service computing device can determine, based on the merchant profiles, that two or more merchants are complementary. Based on the complementary determination, the service computing device can group the merchants together, and build the multi-merchant loyalty program.

In some examples, the service computing device can query the complementary merchants regarding a willingness to participate in a multi-merchant loyalty program. The service computing device can query at a time that the merchant is onboarding (e.g., requesting a service of the POS system service provider) and/or at a time in which a complementary determination is made. In such examples, responsive to an affirmative response to the query, the service computing device can group the merchants together in a multi-merchant loyalty program.

Figure 5:
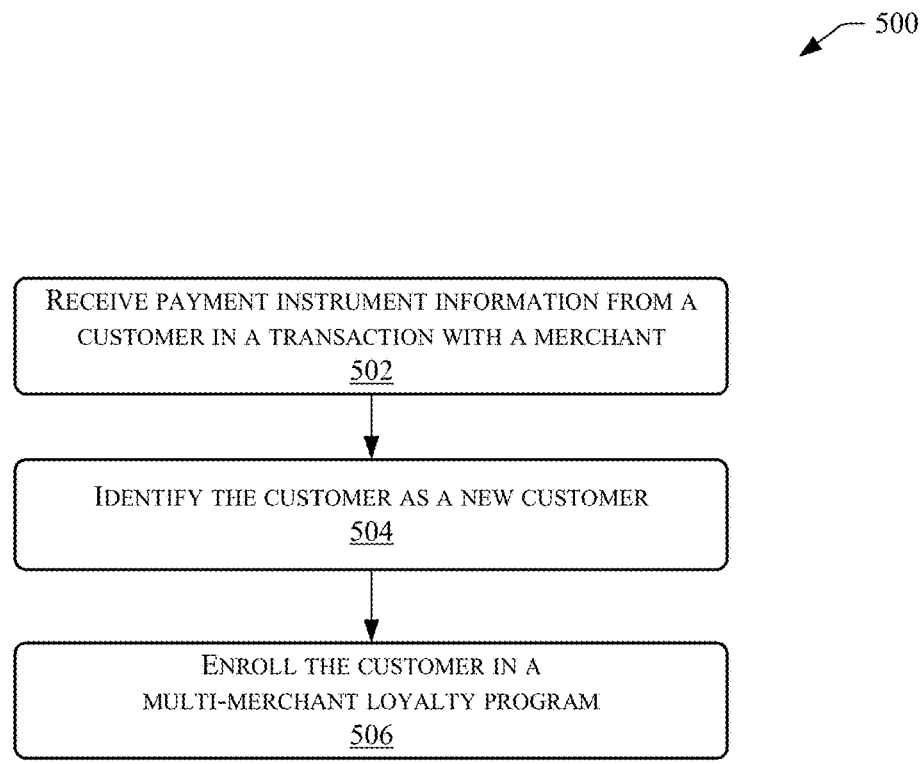
FIG. 5 illustrates a flow diagram of an example process for enrolling a customer in a multi-merchant loyalty program.

FIG. 5 illustrates a flow diagram of an example process for enrolling a customer in a multi-merchant loyalty program.

At 502, the service computing device receives payment instrument information from a customer during a transaction with a merchant. The payment instrument (e.g., a gift card, a debit card, a credit card, etc.) can be used to transfer funds between the customer and the merchant to pay for the transaction. The payment instrument information can include a number associated with the card, banking information, customer information (e.g., a customer name, contact information, average household income, transaction history, and the like).

The payment instrument information can be received via a card reader at point-of-sale device of the merchant. The card reader can receive the payment instrument information via a magnetic strip, a chip, a near-field communication device, and the like. In some examples, the payment instrument information can be transmitted from a customer device (e.g., a cell phone, personal digital assistant, tablet computing device, etc.) to the merchant point-of-sale device, such as via a wireless connection (e.g., Bluetooth®, Wi-Fi, etc.).

At 504, the service computing device identifies the customer as a new customer. In various examples, the new customer determination can be specific to the merchant with whom the customer is conducting a transaction at the time. In some examples, the POS system service provider can recognize the customer as a new customer based on information transmitted via the payment instrument used to conduct the transaction. In some examples, the POS system service provider can determine the customer is new based on a use of a gift card to conduct the transaction. In other examples, the POS system service provider can determine the new customer status by evaluating the merchant profile and/or the customer profile to determine if the payment instrument has been used in a previous transaction. In some example, the POS system service provider can determine the new customer status by receiving input from the merchant and/or the customer indicating the customer is new. In such examples, the merchant can query the customer, and could input the new customer indication.

At 506, the service computing device enrolls the customer in a multi-merchant loyalty program. The multi-merchant loyalty program can be a combined loyalty program between the merchant with whom the customer is conducting the transaction and one or more other complementary merchants.

In various examples, the customer can be automatically enrolled in the multi-merchant loyalty program, responsive to conducting the transaction. In such examples, the customer can receive rewards and/or benefits at any of the merchants participating in the multi-merchant loyalty program automatically after conducting the first transaction with the merchant, such as by using the payment instrument. In some examples, the service computing device may determine contact information from the payment instrument information. In such examples, the service computing device may use the contact information as a means to issue a credit (e.g., points, coupons, discounts, etc.) and/or communicate benefits and/or rewards associated with being enrolled in the multi-merchant loyalty program. In some examples, the service computing device may store benefits, rewards, and/or indication thereof on a customer profile. In such examples, the credit can be accessed by a merchant of the multi-merchant loyalty program and/or by the customer via the customer profile.

In some examples, the customer can be queried regarding a willingness to be enrolled in the multi-merchant loyalty program. In such examples, the customer may be asked whether they would like to participate, and/or may be requested to input contact information, such as an email address, phone number, etc., in order to communicate benefits and/or rewards associated with the program.

In various examples, the customer can be further incentivized to join the multi-merchant loyalty program. In such examples, the customer can be offered bonus discounts, coupons, and/or points for inputting contact information and joining the multi-merchant loyalty program.

Figure 6:
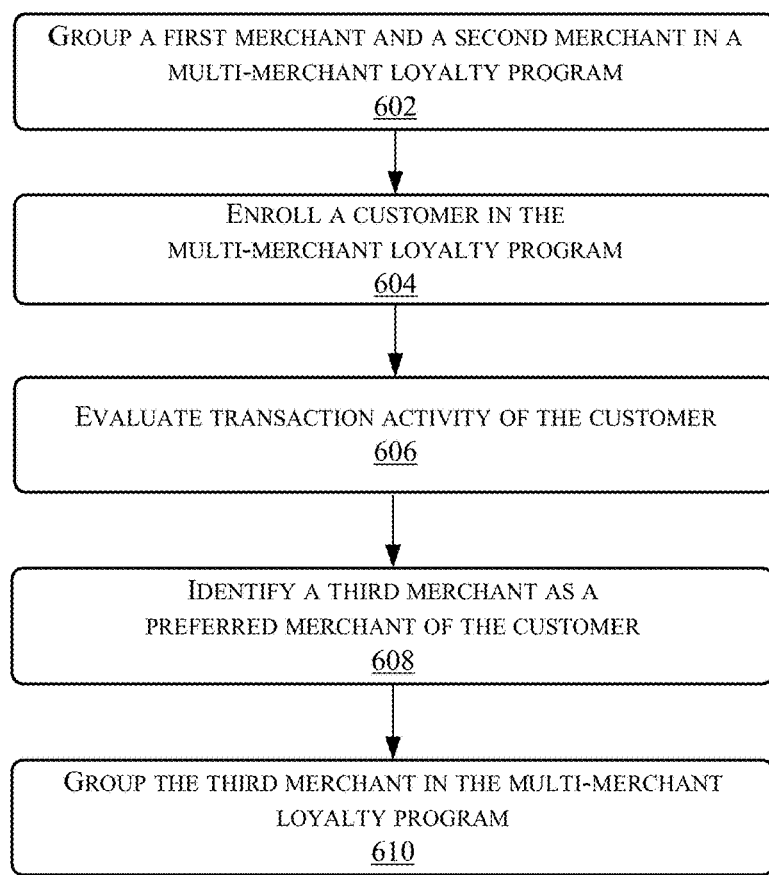
FIG. 6 illustrates a flow diagram of an example process for adding a merchant to a multi-merchant based on customer activity.

FIG. 6 illustrates a flow diagram of an example process for adding a merchant to a multi-merchant based on customer activity.

At 602, the service computing device groups (e.g., associate) a first merchant and a second merchant in a multi-merchant loyalty program. The service computing device can first determine that the first merchant and the second merchant are complementary. A complementary determination can be based on a comparison of merchant profiles (e.g., existing client of the POS system service provider) and/or merchant information (e.g., new client of the POS system service provider) provided in an application. In various examples, merchants can be considered complementary based on respective merchant types, goods and/or services for sale, quality of goods and/or services, same or similar clientele, transaction history, merchant locations, and any other factors which may contribute to one merchant complementing another.

The grouping of merchants can link complementary merchants into a combined loyalty program. The combined loyalty program can provide a means by which merchants can share customer loyalty rewards, frequent-buyer points, marketing opportunities, and the like between one another in order to encourage additional transactions with the customer. For example, a customer can conduct a transaction with the first merchant, and in response to the transaction, receive a coupon for a transaction with the second merchant. For another example, the customer can conduct a transaction with the first merchant and receive frequent-buyer points, such as one point per dollar spent. The customer can then conduct a transaction with the second merchant and use the frequent-buyer points to receive a discount and/or other benefit in the transaction with the second merchant.

In various examples, the service computing device can issue a credit (e.g., points, coupons, discounts, etc.) to the customer responsive to conducting the transaction with a merchant of the combined loyalty program. In such examples, the service computing device can link the credit to a payment instrument of the customer. The credit can thus be available at a subsequent transaction in which the customer uses the payment instrument.

In various examples, the service computing device can automatically group complementary merchants together into a multi-merchant loyalty program. In such examples, the service computing device can determine, based on the merchant profiles, that two or more merchants are complementary. Based on the complementary determination, the service computing device can group the merchants together, and build the multi-merchant loyalty program.

In some examples, the service computing device can query the complementary merchants regarding a willingness to participate in a multi-merchant loyalty program. The service computing device can query at a time that the merchant is onboarding (e.g., requesting a service of the POS system service provider) and/or at a time in which a complementary determination is made. In such examples, responsive to an affirmative response to the query, the service computing device can group the merchants together in the multi-merchant loyalty program.

At 604, the service computing device enrolls a customer in the multi-merchant loyalty program. In various examples, the customer can be automatically enrolled in the multi-merchant loyalty program, responsive to conducting a transaction with the first merchant and/or the second merchant. In such examples, the customer can receive rewards and/or benefits at any of the merchants participating in the multi-merchant loyalty program automatically after conducting the first transaction, such as by using the payment instrument. In some examples, the service computing device may determine contact information from the payment instrument information. In such examples, the service computing device may use the contact information as a means to issue a credit (e.g., points, coupons, discounts, etc.) and/or communicate benefits and/or rewards associated with being enrolled in the multi-merchant loyalty program. In some examples, the service computing device may store benefits, rewards, and/or indication thereof on a customer profile. In such examples, the credit can be accessed by a merchant of the multi-merchant loyalty program and/or by the customer via the customer profile.

In some examples, the service computing device can enroll the customer in the multi-merchant loyalty program responsive to an affirmative response to a participation query. In such examples, the customer may be asked whether they would like to participate, and/or may be requested to input contact information, such as an email address, phone number, etc., in order to communicate benefits and/or rewards associated with the program.

At 606, the service computing device can evaluate transaction activity of the customer. The transaction activity can include a transaction history, habitual transactional acts of the customer, and the like. In various examples, the transaction activity may include a temporal aspect (e.g., time between transactions with a particular merchant, time between transactions with different merchants, etc.) For example, the service computing device may can identify that the customer conducts a transaction with a first merchant at about the same time every day, Monday through Friday. For another example, the service computing device can identify that the customer frequently conducts a transaction with a second merchant shortly after the transactions with the first merchant.

At 608, the service computing device can identify a third merchant as a preferred merchant of the customer. In various examples, a merchant can be a preferred merchant based on a frequency of transactions the customer conducts with the merchant. In such examples, the frequency of transactions can include a temporal component, such as a frequency of transactions within a period of time (e.g., daily, weekly, monthly, etc.). In some examples, the merchant can be a preferred merchant based on a customer preference. In such examples, the customer may input one or more preferences for particular merchants.

In various examples, the identification of the third merchant as a preferred merchant can include an identification of a customer-derived complementary relationship between the preferred merchant and one or more merchants of the multi-merchant loyalty program. In some examples, the customer-derived complementary relationship may be based on concurrent transactions between the customer and the preferred merchant and the customer and the one or more merchants of the multi-merchant loyalty program, and/or a frequency thereof. For example, a customer may often conduct a transaction with a merchant in an established multi-merchant loyalty program and shortly thereafter conduct a transaction with another merchant. Based on the frequent concurrent transactions, the other merchant may be identified as a preferred merchant.

At 610, the service computing device can group the third merchant in the multi-merchant loyalty program. The third merchant can be grouped into the multi-merchant loyalty program based on the transaction activity and/or the identification as a preferred merchant. In various examples, the service computing device can automatically join the third merchant to the multi-merchant loyalty program. In some examples, prior to grouping the third merchant in the multi-merchant loyalty program, the service computing device may query the third merchant to determine a willingness to participate in the program. In some examples, the query may be open-ended, describing the multi-merchant loyalty program and the benefits associated therewith. In such examples, the query may occur when the third merchant signs up for a service with the POS system service provider, and/or after a customer-derived complementary relationship has been identified.

In some examples, the query may be specific to particular merchants, requesting permission of the merchants to be associated with the specific merchants with a customer-derived complementary relationship. In such examples, the service computing device can query the first and second merchants regarding a willingness to participate in the multi-merchant loyalty program with the third merchant, and vice versa.

In various examples, prior to grouping the third merchant in the multi-merchant loyalty program, the service computing device can evaluate the third merchant and can determine whether the third merchant is complementary to the first and the second merchants. In such examples, responsive to a determination that the merchants are complementary, the service computing device can group the third merchant in the multi-merchant loyalty program.

In some examples, the multi-merchant loyalty program may include a threshold number of merchants. In such examples, the grouping of the third merchant into the multi-merchant loyalty program may be based on the addition of the third merchant not exceeding the threshold number of merchants in the program. The threshold number of merchants can be based on a maximum number of other merchants a particular merchant is willing to be associated with.

Figure 7:
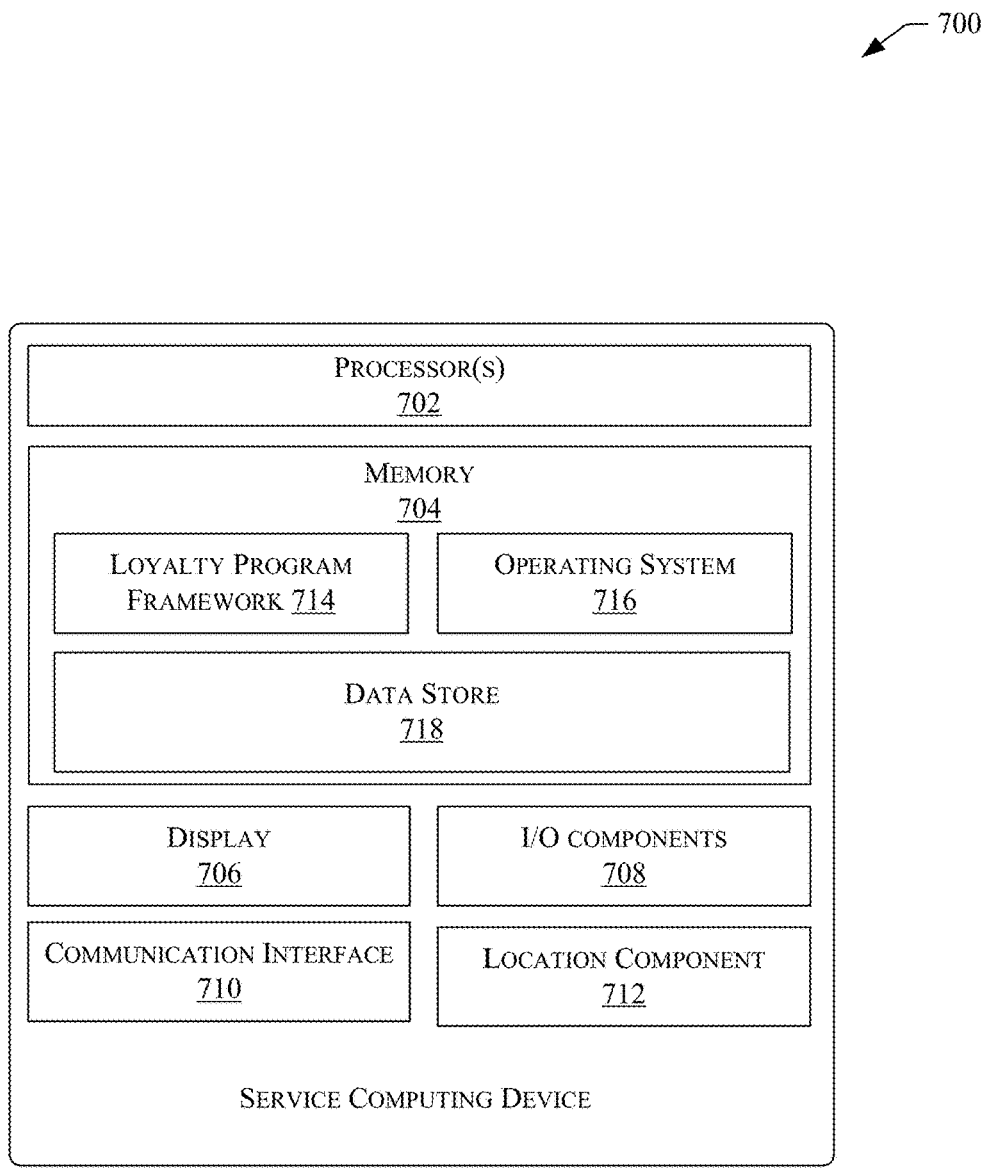
FIG. 7 illustrates select components of an example service computing device that a POS system service provider may use to generate multi-merchant loyalty programs and enroll customers therein, according to some implementations.

FIG. 7 illustrates select components of an example service computing device 700 that a POS system service provider may use to generate multi-merchant loyalty programs and enroll customers therein, according to some implementations. The service computing device 700 may be any suitable type of computing device, e.g., mobile, semi-mobile, semi-stationary, or stationary. In various examples, the service computing device 700 can be one of a plurality of service computing devices in a distributed computing resource.

Some examples of the service computing device 700 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the service computing device 700 includes at least one processor 702, such as processor 206, at least one memory 704, such as memory 208, a display 706, one or more input/output (I/O) interfaces 708, one or more communication interfaces 710, such as communication interface 220, and at least one location component 712.

Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the memory 704.

Depending on the configuration of the service computing device 700, the memory 704 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 704 may include, but is not limited to, RAM, ROM, EEPROM, flash memory, solid-state storage, magnetic disk storage, optical storage, and/or other computer-readable media technology. Further, in some cases, the service computing device 700 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702. Further, when mentioned, non-transitory computer-readable media excludes media such as energy, carrier signals, electromagnetic waves, and signals per se.

The memory 704 may be used to store and maintain any number of functional components that are executable by the processor 702. In some implementations, these functional components comprise instructions or programs that are executable by the processor 702 and that, when executed, implement operational logic for performing the actions and services attributed above to the service computing device 700. Functional components of the service computing device 700 stored in the memory 704 may include a loyalty program framework 714, such as loyalty program framework 210, discussed above. The loyalty program framework 714 may Additional functional components may include an operating system 716 for controlling and managing various functions of the service computing device 700 and for enabling basic user interactions with the service computing device 700 and/or a customer device. The memory 704 may also store a data store 718. The data store 718 may be configured to store merchant profiles, customer profiles and/or other information pertaining to merchants and associated customers.

In addition, the memory 704 may also store data, data structures and the like, that are used by the functional components. Depending on the type of the service computing device 700, the memory 704 may also optionally include other functional components and data, which may include programs, drivers, etc., and the data used or generated by the functional components. Further, the service computing device 700 may include many other logical, programmatic and physical components, of which those described are merely examples that are related to the discussion herein.

The one or more communication interface(s) 710 may include one or more interfaces and hardware components for facilitating communication with various other devices over a network or directly. For example, communication interface(s) 710 may facilitate communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the service computing device 700 may include one or more displays 706 mentioned above. Depending on the type of computing device used as the service computing device 700, the one or more displays 706 may employ any suitable display technology. For example, the one or more displays 706 may be liquid crystal displays, plasma displays, light emitting diode displays, OLED (organic light-emitting diode) displays, electronic paper displays, or any other suitable type of displays able to present digital content thereon. However, implementations described herein are not limited to any particular display technology.

The I/O interfaces 708, meanwhile, may include speakers, a microphone, a camera, and various user controls (e.g., buttons, a joystick, a keyboard, a keypad, etc.), a haptic output device, and so forth.

The location component 712 may include a GPS device able to indicate location information, or the location component 712 may comprise another other location-based sensor. The service computing device 700 may also include one or more additional sensors (not shown), such as an accelerometer, gyroscope, compass, proximity sensor, and the like. Additionally, the service computing device 700 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by a service computing device associated with a payment processing service, first customer information associated with a customer conducting a first transaction with a first merchant;
   based at least in part on the first customer information, determining, by the service computing device, a complementary relationship between the first merchant and a second merchant;
   based at least in part on determining the complementary relationship, associating, by the service computing device, the first merchant and the second merchant in a combined loyalty program, wherein the combined loyalty program applies to purchases from at least the first merchant and the second merchant;
   processing, by the service computing device, a first payment for the first transaction;
   receiving, by the service computing device, second customer information associated with a second transaction between the customer and the second merchant;
   responsive to receiving the second customer information, determining, by the service computing device, that the customer is enrolled in the combined loyalty program;
   based at least in part on determining that the customer is enrolled, communicating, by the service computing device, one or more accrued benefits to the customer on a customer device associated with the customer or a merchant device associated with the second merchant, wherein the one or more accrued benefits are based at least in part on benefits earned by the customer in a purchase from first merchant; and
   processing, by the service computing device, a second payment for the second transaction.

2. The method as claim 1 recites, wherein one or more of the first customer information or the second customer information comprises at least one of payment information, a customer name, or customer contact information.

3. The method as claim 1 recites, wherein the one or more accrued benefits are further based at least in part on benefits earned in a previous transaction with a third merchant.

4. The method as claim 1 recites, wherein the merchant device comprises a second merchant device, and wherein receiving the first customer information comprises receiving the first customer information from a first merchant device, the method further comprising:
   determining, by the service computing device, that the customer is a new customer to the first merchant based at least in part on at least one of the first customer information, first input to the first merchant device, or second input to the customer device.

5. The method as claim 1 recites, further comprising:
   determining, by the service computing device, a customer profile associated with the customer based at least in part on the second customer information, wherein the customer profile is maintained at the service computing device; and
   determining, by the service computing device, the one or more accrued benefits based at least in part on the customer profile.

6. The method as claim 5 recites, further comprising:
   at least partly responsive to processing the second payment for the second transaction, issuing, by the service computing device, a credit to the customer based on the second transaction, wherein issuing the credit comprises at least one of causing the credit to be stored in association with the customer profile or sending the credit to the customer via an electronic communication.

7. The method as claim 6 recites, wherein the credit comprises at least one of one or more loyalty points, one or more reward points, a coupon, or a discount redeemable in one or more future transactions associated with the combined loyalty program.

8. The method as claim 1 recites, wherein the merchant device comprises a point-of-sale (POS) device, and wherein the receiving the second customer information comprises receiving the second customer information from the POS device.

9. The method as claim 1 recites, wherein at least one of (i) the receiving the first customer information comprises receiving the first customer information from the customer device, or (ii) the receiving the second customer information comprises receiving the second customer information from the customer device.

10. A service computing device associated with a payment processing service, the service computing device comprising:
    one or more processors; and
    one or more computer-readable media storing instructions executable by the one or more processors, wherein the instructions program the one or more processors to perform actions comprising:
      receiving, by the service computing device and from a point-of-sale (POS) device associated with a first merchant, first customer information associated with a customer engaged in a first transaction with the first merchant;

based at least in part on the first customer information, determining, by the service computing device, a complementary relationship between the first merchant and a second merchant;

based at least in part on determining the complementary relationship, associating, by the service computing device, the first merchant and the second merchant in a combined loyalty program, wherein the combined loyalty program applies to purchases from at least the first merchant and the second merchant;

processing by the service computing device, a first payment for the first transaction;

receiving, by the service computing device, second customer information associated with a second transaction between the customer and the second merchant;

based at least in part on the second customer information, a customer profile of the customer, and a merchant profile of the second merchant, determining, by the service computing device, benefits accrued by the customer in the combined loyalty program, wherein the benefits are based at least in part on a purchase by the customer from at least the first merchant;

causing presentation, by the service computing device, of an indication of the benefits via a merchant device associated with the second merchant or via a device associated with the customer; and processing, by the service computing device, a second payment for the second transaction.

11. The service computing device as claim 10 recites, wherein the first merchant and the second merchant are more than a threshold distance from each other.

12. The service computing device as claim 10 recites, the actions further comprising:

responsive to processing the second payment for the second transaction, issuing, by the service computing device, a credit to the customer based at least in part on the second transaction, wherein issuing the credit comprises at least one of causing the credit to be stored in association with the customer profile, or sending the credit to the customer via an electronic communication.

13. The service computing device as claim 12 recites, wherein the credit comprises one or more of one or more loyalty points, one or more reward points, a coupon, or a discount redeemable in one or more future transactions with at least one of the first merchant or the second merchant.

14. The service computing device as claim 10 recites, the actions further comprising:

determining, by the service computing device, that the customer is a new customer to the first merchant based at least in part on at least one of the first customer information, first input to the POS device, or second input to the device associated with the customer.

15. The service computing device as claim 10 recites, wherein one or more of the first customer information or the second customer information comprises at least one of payment information, a customer name, or customer contact information.

16. A method comprising:

receiving, by a service computing device of a payment processing service, first transaction data associated with a first transaction between a customer and a first merchant, wherein the first transaction data includes first customer information;

based at least in part on the first customer information, determining, by the service computing device, a complementary relationship between the first merchant and a second merchant;

based at least in part on determining the complementary relationship, associating, by the service computing device, the first merchant and the second merchant in a combined loyalty program, wherein the combined loyalty program applies to purchases by the customer from at least the first merchant and the second merchant;

processing, by the service computing device, a first payment for the first transaction;

receiving, by the service computing device, second transaction data associated with a second transaction between the customer and the second merchant, wherein the second transaction data includes second customer information;

determining, by the service computing device and based at least in part on the second customer information that the customer is enrolled in the combined loyalty program;

based at least in part on determining the customer is enrolled in the combined loyalty program, communicating, by the service computing device, one or more combined loyalty program benefits accrued by the customer to a merchant device associated with the second merchant or a customer device associated with the customer, wherein the one or more combined loyalty program benefits are based at least in part on benefits earned by the customer in a purchase from the first merchant; and based at least in part on the second transaction data, processing, by the service computing device, a second payment for the second transaction.

17. The method as claim 16 recites, further comprising:

receiving, by the service computing device and from the customer device or the merchant device, an indication that the customer intends to redeem one or more of the one or more combined loyalty program benefits, wherein processing the payment is further based at least in part on the one or more of the one or more combined loyalty program benefits redeemed, and wherein the payment for the second transaction is for a reduced purchase amount.

18. The method as claim 16 recites, wherein communicating the one or more combined loyalty program benefits comprises causing presentation of an indication of the one or more combined loyalty program benefits on a first display associated with the customer device or a second display associated with the merchant device.

19. The method as claim 16 recites, further comprising:

enrolling, by the service computing device, the customer in the combined loyalty program based at least in part on the first customer information.

20. The method as claim 16 recites, wherein receiving the first transaction data comprises receiving the first transaction data from a first point-of-sale (POS) device of the first merchant.

* * * * *